(12) United States Patent
Cherubini et al.

(10) Patent No.: US 9,313,675 B2
(45) Date of Patent: Apr. 12, 2016

(54) TELECOMMUNICATIONS NETWORK NODE CONFIGURATION

(75) Inventors: Davide Cherubini, Castleknock (IE);
Razavi Rouzbeh, Blanchardstown (IE);
Lester Tse Wee Ho, Blanchardstown (IE); Michele Portolan, Amboise (FR)

(73) Assignee: Alcatel Lucent, Boulogne-Billancourt (FR)

( * ) Notice: Subject to any disclaimer, the term of this patent is extended or adjusted under 35 U.S.C. 154(b) by 255 days.

(21) Appl. No.: 13/522,088

(22) PCT Filed: Dec. 16, 2010

(86) PCT No.: PCT/EP2010/007773
§ 371 (c)(1),
(2), (4) Date: Oct. 17, 2012

(87) PCT Pub. No.: WO2011/085785
PCT Pub. Date: Jul. 21, 2011

(65) Prior Publication Data
US 2013/0053046 A1    Feb. 28, 2013

(30) Foreign Application Priority Data
Jan. 18, 2010 (EP) .................................... 10290033

(51) Int. Cl.
*H04W 40/00* (2009.01)
*H04W 24/04* (2009.01)
*H04W 16/18* (2009.01)
*H04W 84/04* (2009.01)

(52) U.S. Cl.
CPC .............. *H04W 24/04* (2013.01); *H04W 16/18* (2013.01); *H04W 84/045* (2013.01)

(58) Field of Classification Search
CPC ..................................................... H04W 88/08
See application file for complete search history.

(56) References Cited

U.S. PATENT DOCUMENTS

| | | | |
|---|---|---|---|
| 2004/0229621 A1* | 11/2004 | Misra | 455/445 |
| 2005/0289228 A1 | 12/2005 | Srikanth et al. | |
| 2008/0064361 A1* | 3/2008 | Bjork et al. | 455/403 |
| 2008/0096556 A1* | 4/2008 | Shinozaki | 455/435.1 |
| 2009/0131049 A1* | 5/2009 | Osborn | 455/435.1 |
| 2011/0275397 A1* | 11/2011 | Guey et al. | 455/509 |

FOREIGN PATENT DOCUMENTS

| | | |
|---|---|---|
| EP | 1 830 515 A1 | 9/2007 |
| EP | 1 848 159 A1 | 10/2007 |
| WO | WO 02/080458 A1 | 10/2002 |

OTHER PUBLICATIONS

International Search Report for PCT/EP2010/007773 dated Apr. 15, 2011.

* cited by examiner

*Primary Examiner* — Keith Fang
(74) *Attorney, Agent, or Firm* — Fay Sharpe LLP

(57) ABSTRACT

A method is provided of configuring nodes of a telecommunications network, in which nodes react to changes in configuration of at least one of their respective neighbor nodes. The method includes the steps of: identifying a cluster of neighboring nodes, identifying which nodes in a cluster are in a frontier region adjacent another cluster, adapting the configuration of nodes in the frontier region in response to the configuration of other nodes in the frontier region, and adapting the configuration of nodes in the cluster in response to the adapted configuration of other nodes in the cluster while considering the configuration of the nodes in the frontier region as set.

15 Claims, 12 Drawing Sheets flowchart

TELECOMMUNICATIONS NETWORK NODE CONFIGURATION

FIELD OF THE INVENTION

The present invention relates to telecommunications, in particular to configuring nodes in a telecommunications network.

DESCRIPTION OF THE RELATED ART

Decentralised algorithms for self-configuring of nodes in networks suffer from the risk that they may not converge to usable solutions. This is particularly so in large networks having many interacting nodes. For example, in many situations in network optimisation, the configuration of a network node, for example a base station for cellular communications or an optical switch, is dependent on the configuration of a neighbouring network node, and vice versa. This means that when a network node changes its configuration, in the sense of changing a property or characteristic of the network node, this triggers neighbouring nodes to change theirs, which causes their neighbouring network nodes to change theirs, and so on. This is a problem that can cause a lot of disruption in the network, and may even cause a catastrophic failure if the disruption is severe and propagates throughout the network.

The behaviour of large networks of interacting nodes that are distributed in the sense of lacking central control, cannot be predicted precisely. This because such systems are complex and accurate analysis is difficult or not possible. Furthermore, the information available to individual nodes is limited.

Conversely, in systems having central or centralised control, a central control has a good picture of the overall system and can therefore decide on a good network configuration, for example as regards implementing self-configuring algorithms in network nodes, and so implement that configuration in a well-controlled manner. However, centralised approaches suffer scalability issues in that they are difficult to apply to a large scale network, for example to a rapidly changing network with a large number of nodes, such as femtocell deployments.

In this text, femtocell base stations are sometimes referred to as femtos.

SUMMARY

The reader is referred to the appended independent claims. Some preferred features are laid out in the dependent claims.

An example of the present invention is a method of configuring nodes of a telecommunications network, in which nodes react to changes in configuration of at least one of their respective neighbour nodes. The method includes the steps of:

identifying a cluster of neighbouring nodes, identifying which nodes in the cluster are in a frontier region adjacent to another cluster, adapting the configuration of nodes in the frontier region in response to changes in the configuration of other nodes in the frontier region, adapting the configuration of nodes in the cluster in response to changes in the configuration of other nodes in the cluster whilst considering the configuration of the nodes in the frontier region as set.

Preferred embodiments of the present invention partition the network into clusters and implement configuration of the nodes in the boundary region. The nodes in the boundary region limit, to within a cluster, the propagation of changes due to each node adapting its setting in response to a change in a corresponding setting of a neighbouring node. In other words, by dividing the network up into clusters with boundary regions, oscillations and failures may propagate through a cluster but be prevented from continuing into a further cluster. In some embodiments, as the size of clusters is known, hardware can be selected appropriately to perform the computational tasks involved.

BRIEF DESCRIPTION OF THE DRAWINGS

Embodiments of the present invention will now be described by way of example and with reference to the drawings, in which.

DETAILED DESCRIPTION

As an example of network node optimisation, the inventors considered cell coverage optimisation specifically in femtocell deployments, in other words where the netwrk nodes are femtocell base stations. The inventors considered cell coverage optimisation as an example because it is easy to visualise. Of course, other properties or attributes of nodes may be optimised in addition or instead.

Figure 1:
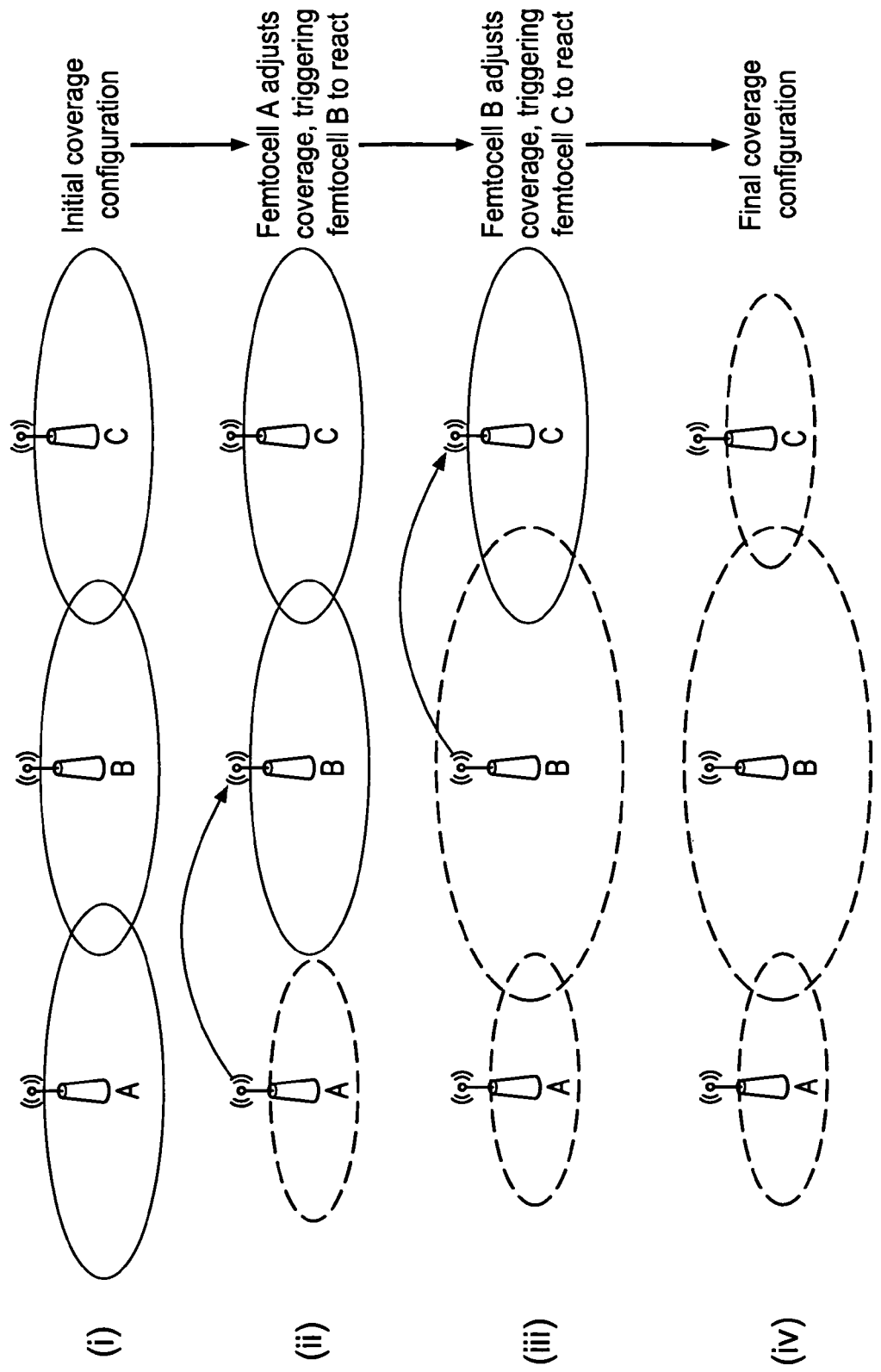
FIG. 1 is a diagram illustrating known propagation of cell coverage changes through a distributed cellular network (PRIOR ART)

The inventors considered the known approaches to cell coverage optimisation in femtocell deployments. Here the coverage of a femtocell is adjusted to achieve objectives such as load balancing, minimising interference, and preventing coverage holes. This is done by changing transmit power of pilot channels and changing the base station antenna configuration. The inventors realised that in known systems where distributed algorithms are used, a change in one part of the network may propagate throughout the network, as shown in FIG. 1 (PRIOR ART). FIG. 1 shows three neighbouring femtocells (A,B, and C) at four sequential instances in time (steps i, ii, iii, and iv). For example, as shown in FIG. 1, FemtocellA decreasing its coverage (step ii) causes its neighbour FemtocellB to increase its coverage (step iii) in consequence so as to fill a coverage gap. This in turn causes FemtocellC to decrease (step iv) its coverage area. Such changes in coverage can lead to temporary conditions where quality of service is reduced and control signalling (as opposed to user traffic) is increased.

Figure 2:
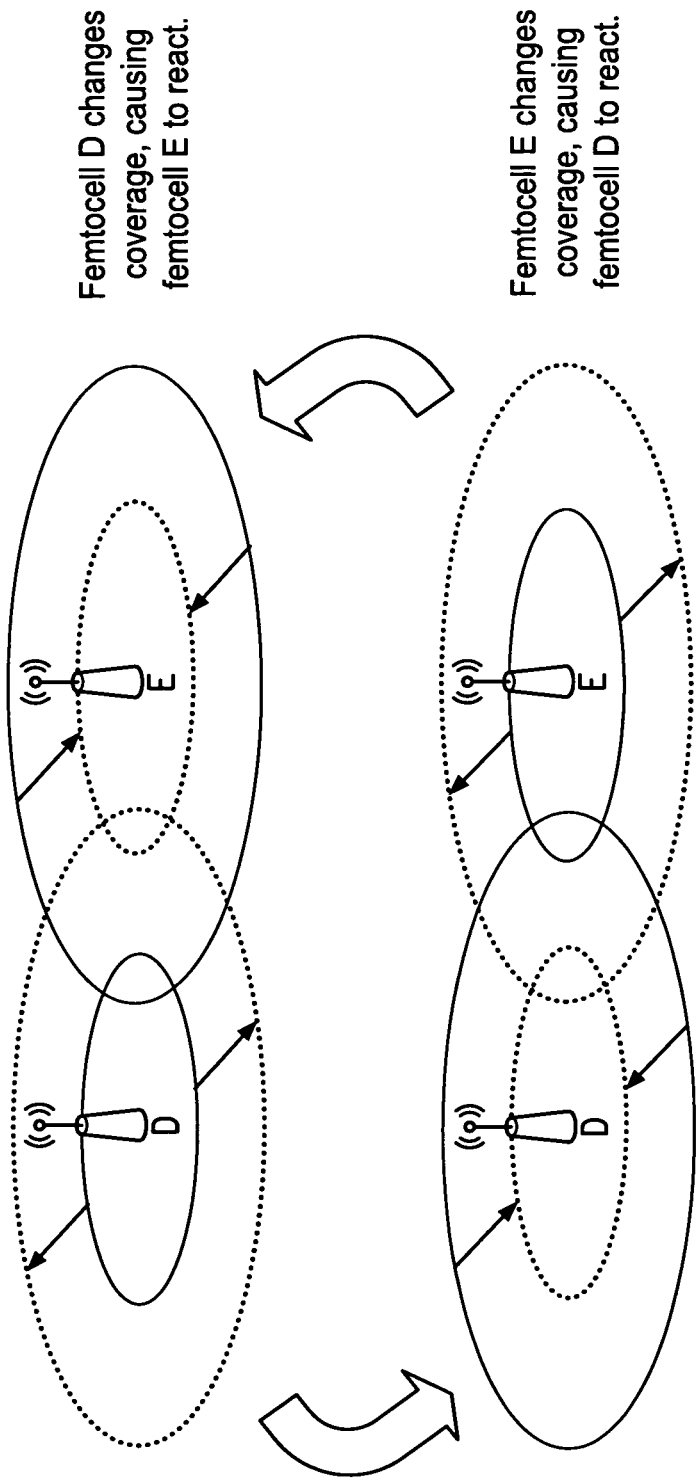
FIG. 2 is a diagram illustrating known oscillations in cell coverage optimisation in the distributed cellular network shown in FIG. 1 (PRIOR ART)

There is also a risk that unstable oscillatory behaviour may occur, where the network fails to converge to a stable configuration. For example, as shown in FIG. 2 (PRIOR ART) two neighbouring femtocells (here denoted D,E,) can get in a loop where each alternately expands and contracts its coverage area to adapt to the coverage area of the other, but a stable coverage area configuration is not achieved. Such disruptions are undesirable.

Turning now to an embodiment of the invention, we again consider coverage optimisation as an example because it is easily visualised. We consider how femtocell having backhaul connections to a common Digital Subscriber Line Access Multiplier (DSLAM) can be consider as a cluster, how each cluster optimises cell coverage within the cluster ("inner optimisation"), how frontiers between clusters are identified, and how femtocells at the frontiers are optimised in their coverage ("boundary optimisation"). By the use of boundary optimisation, cell coverage areas of femtocells at the frontiers become fixed such that disruptions and perturbations in cell coverage areas of femtocells within a cluster are contained within that cluster.

Clustering of Femtocells

Figure 3:
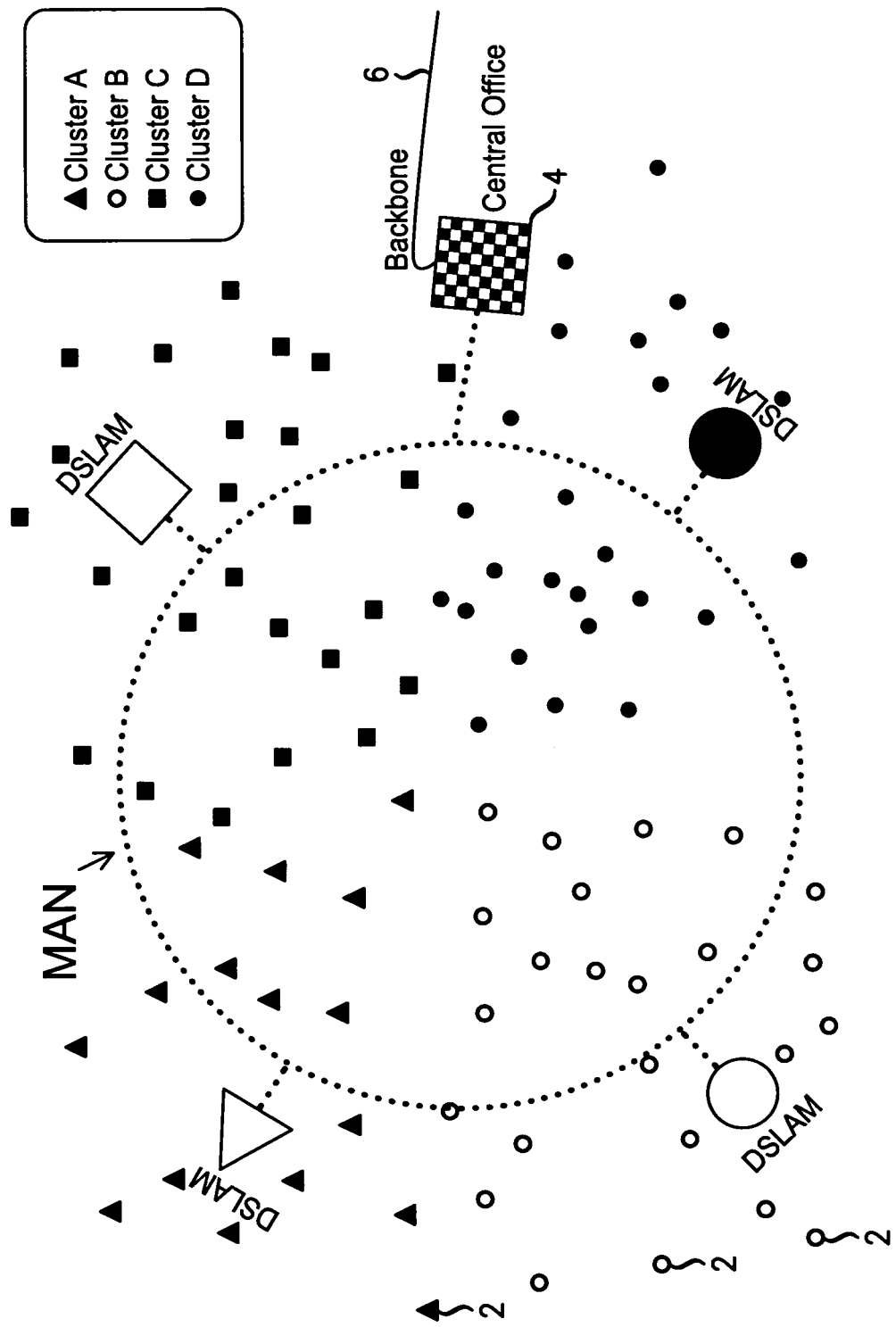
FIG. 3 is a diagram illustrating a network of clusters of cells according to a first embodiment of the invention.

As shown in FIG. 3, femtocell base stations (a few of which are denoted 2 for ease of understanding) are each connected via respective Digital Subscriber Line (xDSL) connections, in other words, Internet backhaul connections, to a Digital Subsciber Line Access Multiplier (DSLAM) shared with other femtocells. All the femtocells connected to the same DSLAM form a cluster. In FIG. 3, four such clusters of femtos, denoted ClusterA, ClusterB, ClusterC and ClusterD are shown, a femto in clusterA is shown as a black triangle, a femto in clusterB is shown as a white-centred circle, a femto in clusterC is shown as a black square, and a femto in clusterD is shown by a black circle. The DSLAMs are connected together in a Metropolitan Access Network (MAN) that includes a central office 4 having backbone connection 6 to the rest of the telecommunications world (not shown). Information is exchanged between DSLAMs via the MAN.

Optimisation within Clusters ("Inner Optimisation")

Figure 4:
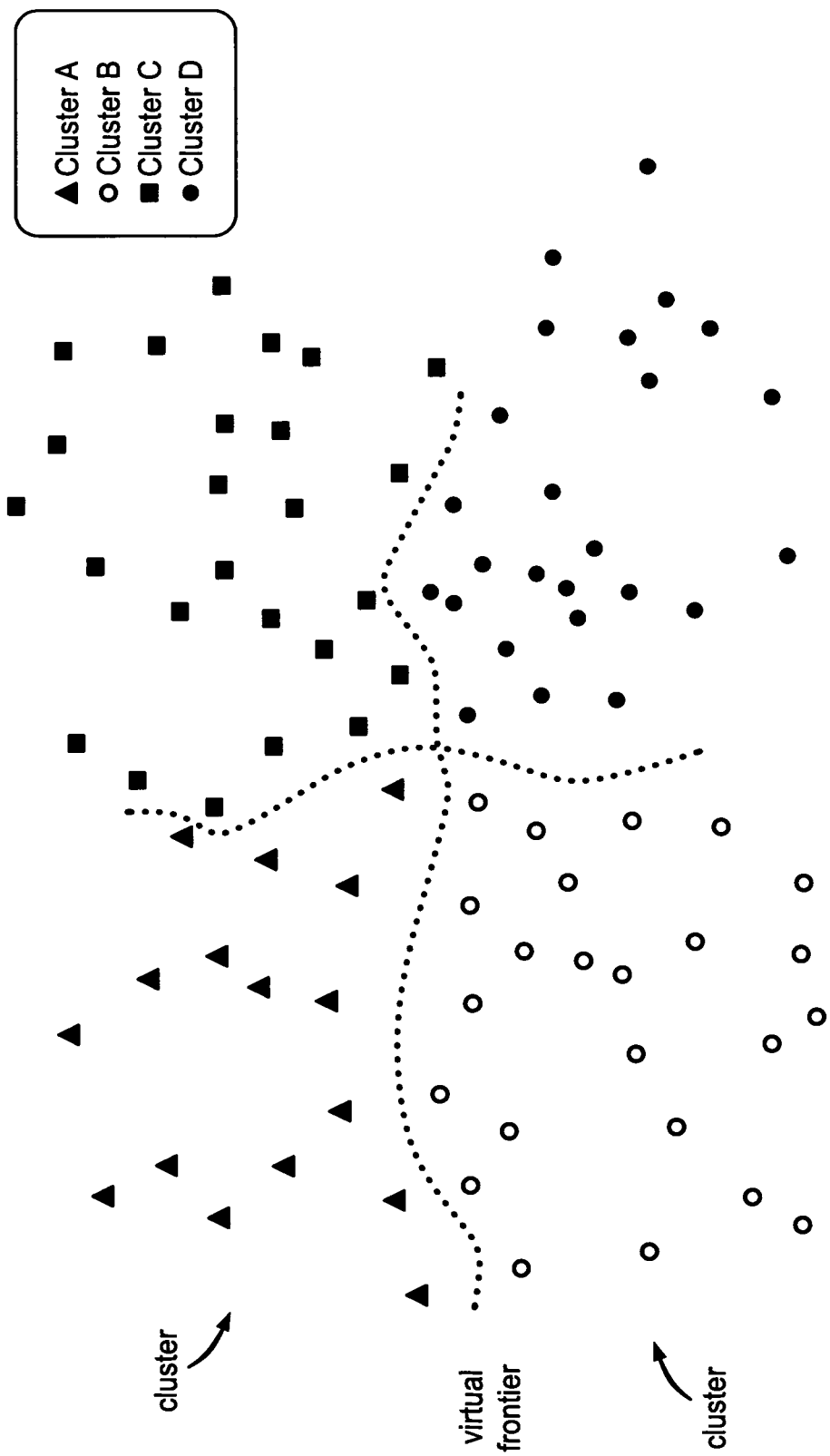
FIG. 4 is a diagram illustrating in-cluster optimisation of cell coverage in the network shown in FIG. 3.

As shown in FIG. 4, initially each cluster independently starts its own femto coverage area optimisation process. In this example, the optimisation process uses genetic programming, as is known from, for example, the paper by Ho L T W, Ashraf I, and Claussen H entitled "Evolving Femtocell Coverage Optimisation Algorithms Using Genetic Programming" in Proc. IEEE PIMRC 9, Sep. 2009, and more generally the book by John Koza "Genetic Programming: On the Programming of Computers by Means of Natural Selection, MIT Press, 1992.

In some other, otherwise similar, embodiments (not shown) alternative methodologies to genetic programming are used, such as Reinforcement Learning and Neuro-fuzzy logic. In some embodiments (not shown) two or more methodologies are used in combination.

As shown in FIG. 4, initially each cluster has no knowledge of its respective neighbours so a frontier between clusters is not defined, and hence can be considered as merely virtual. The optimisation within each cluster is aimed at maximising overall coverage within each cluster area and identifying the frontiers, as explained in relation to FIGS. 5 and 6 below.

Defining Frontiers Between Clusters

Figure 5:
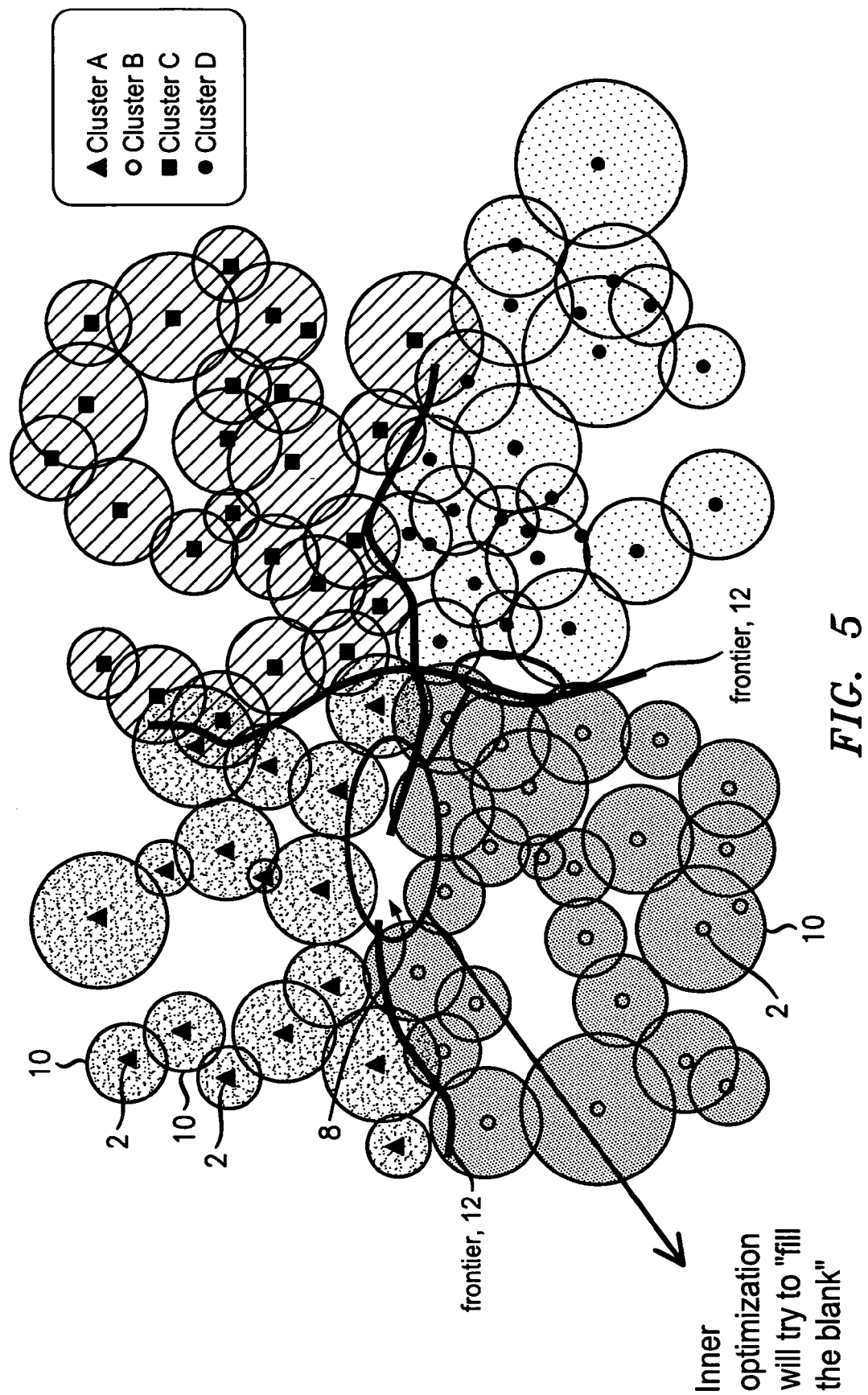
FIG. 5 is a diagram illustrating cell coverage in the network at a later stage in which frontiers between clusters start to be identified.
Figure 6:
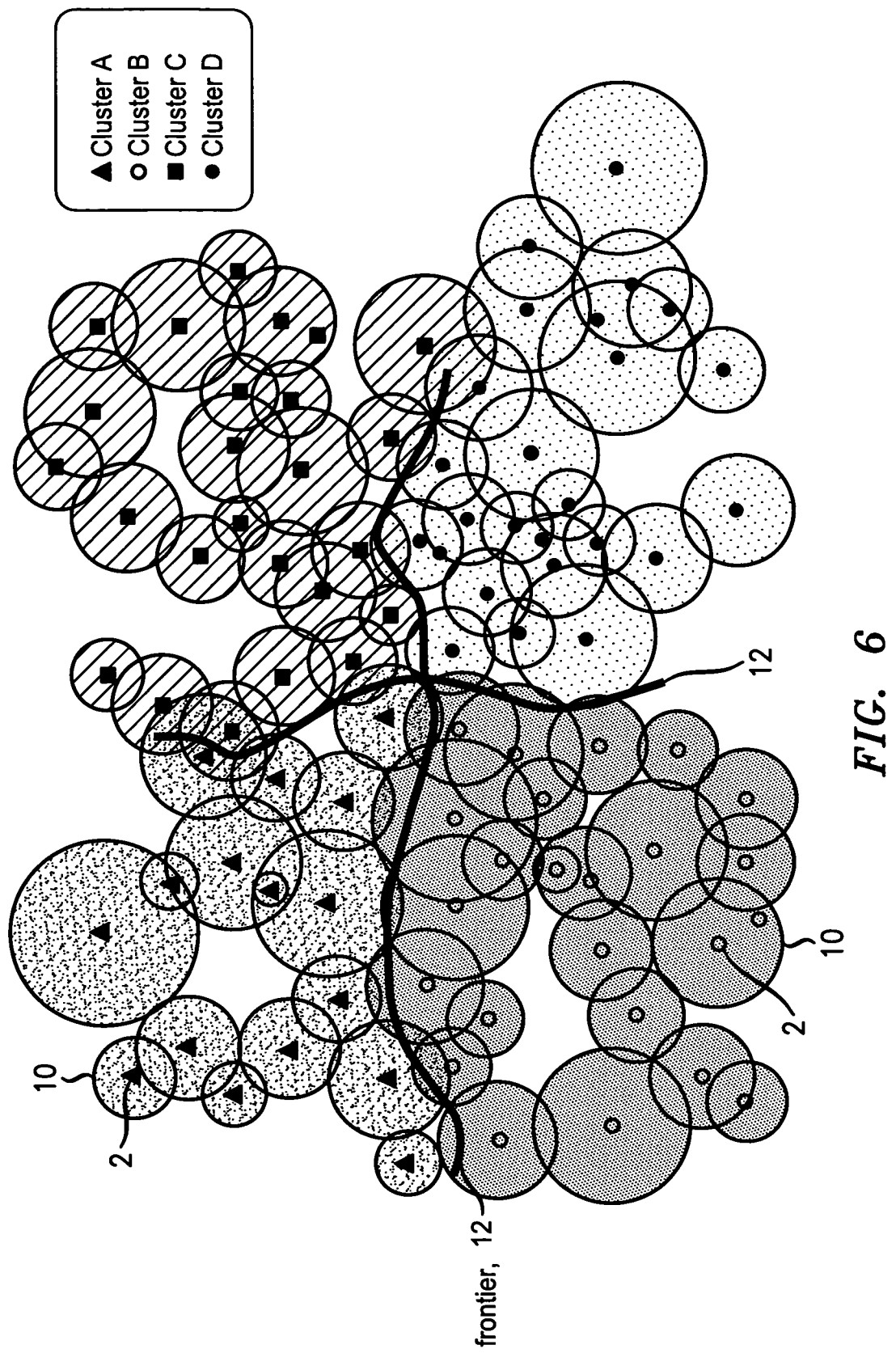
FIG. 6 is a diagram illustrating cell coverage in the network at a later stage at which frontiers between clusters become outlined.

As shown in FIG. 5, each femto 2 has an associated femtocell coverage area, a few of which are indicated by the reference numeral 10 for ease of understanding. In maximising the coverage within each cluster, adjacent clusters will overlap in their coverage area so as to define a respective frontier 12. This can be seen by comparison of FIGS. 5 and 6, where optimisation of coverage areas in clusterA and ClusterB has the effect of filling the area 8 in FIG. 5 where there is no coverage, so as to give the coverage shown in FIG. 6 including defining the frontier between clusterA and clusterB.

The frontier definition process is by feedback information from mobile user terminals. When a mobile user terminal senses it is in the overlapping coverage area of two overlapping femtocells but those two femtocells are connected to different Digital Subscriber Line Access Multipliers (DSLAMs), in other words the two femtos are in different clusters, then the mobile user terminal informs the two femtos of this situation. The two femtos, in turn, each forwards this information to its respective DSLAM, where the information is used to update a database table identifying femtos at the frontier.

In some situations some of the femtos at the frontier are known in advance.

Femtos Identified at a Frontier are Held Steady in Their Coverage Areas

The DSLAM of each cluster removes the femtos that are identified as being at along frontier from the within cluster cell coverage optimisation process. In this within-cluster process, their coverage areas are then considered to be steady rather than variable. Accordingly when a change or perturbation in cell sizes propagates through a cluster, these femtos at the frontier have steady coverage areas so act to inhibit or prevent the change or perturbation moving into a neighbouring cluster.

Coverage Areas of Femtos Identified at a Frontier are Optimised ("Boundary Optimisation")

Figure 7:
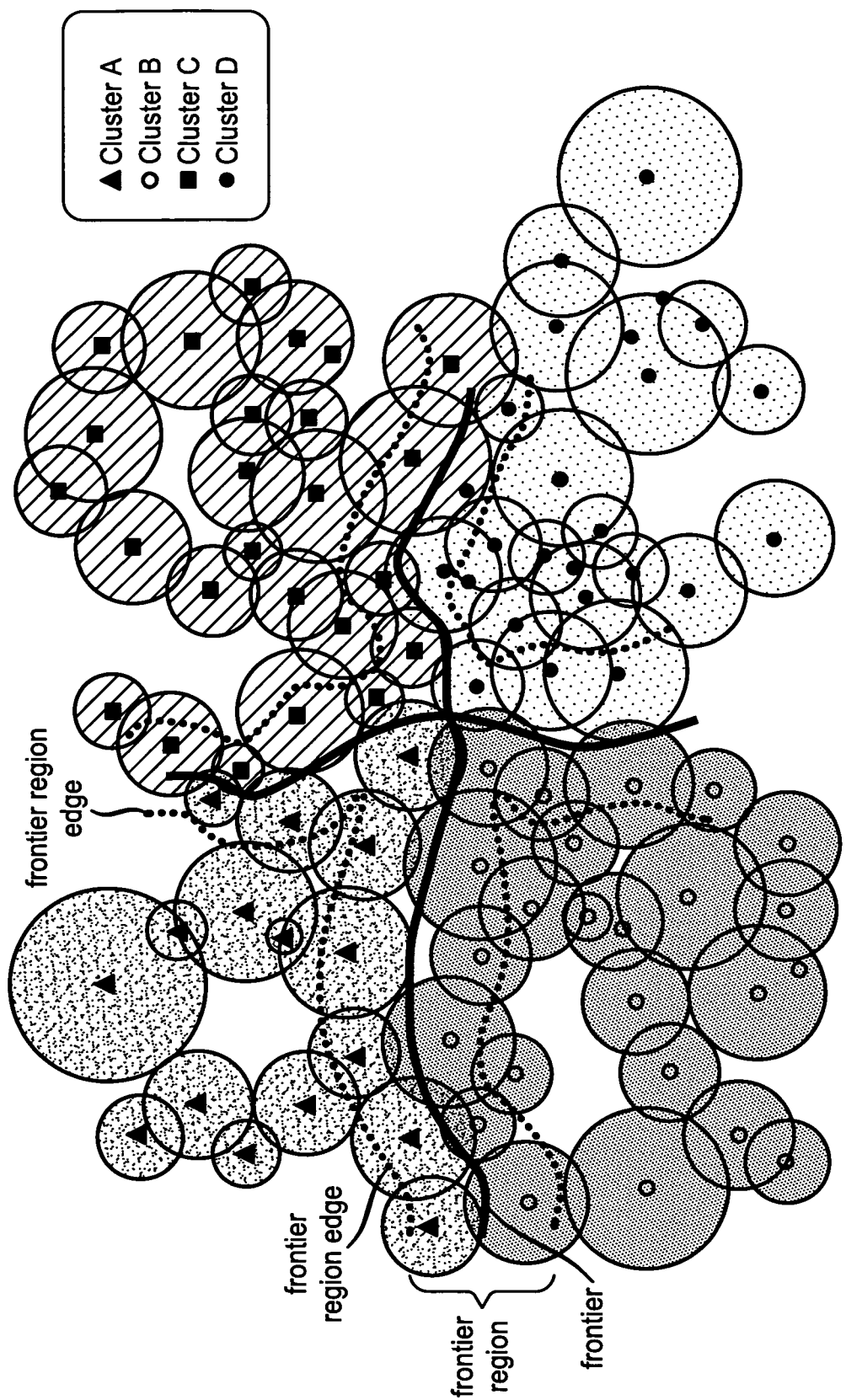
FIG. 7 is a diagram illustrating cell coverage in the network at a later stage at which frontiers become better defined by boundary optimisation.

As shown in FIG. 7, the cells along the frontier with a neighbouring cluster, are optimised as to their cell coverage without further considering the rest of the femtos in their respective clusters. This is to provide maximum coverage in the frontier region only. For the purposes of illustration dashed lines is shown merely to indicate the frontier region edges, such femtos between a frontier (solid line) and frontier region edge (dashed line) are considered at the respective frontier for cell coverage optimisation purposes.

In this example, the optimisation process uses genetic programming, as is known from, for example, the paper by Ho L T W, Ashraf I, and Claussen H entitled "Evolving Femtocell Coverage Optimisation Algorithms Using Genetic Programming" in Proc. IEEE PIMRC 9, Sep. 2009, and more generally the book by John Koza "Genetic Programming: On the Programming of Computers by Means of Natural Selection, MIT Press, 1992. In some other, otherwise similar, embodiments (not shown) alternative methodologies to genetic programming are used, such as Reinforcement Learning and Neuro-fuzzy logic. In some embodiments (not shown) two or more methodologies are used in combination.

This optimisation process is performed by the Digital Subscriber Line Access Multiplier (DSLAM) elected to do that for each frontier. In an alternative embodiment (not shown), this process can be performed in a distributed manner by the relevant femtos. In another alternative embodiment (not shown) this optimisation process is performed by an external entity, for example a computational element.

Figure 8:
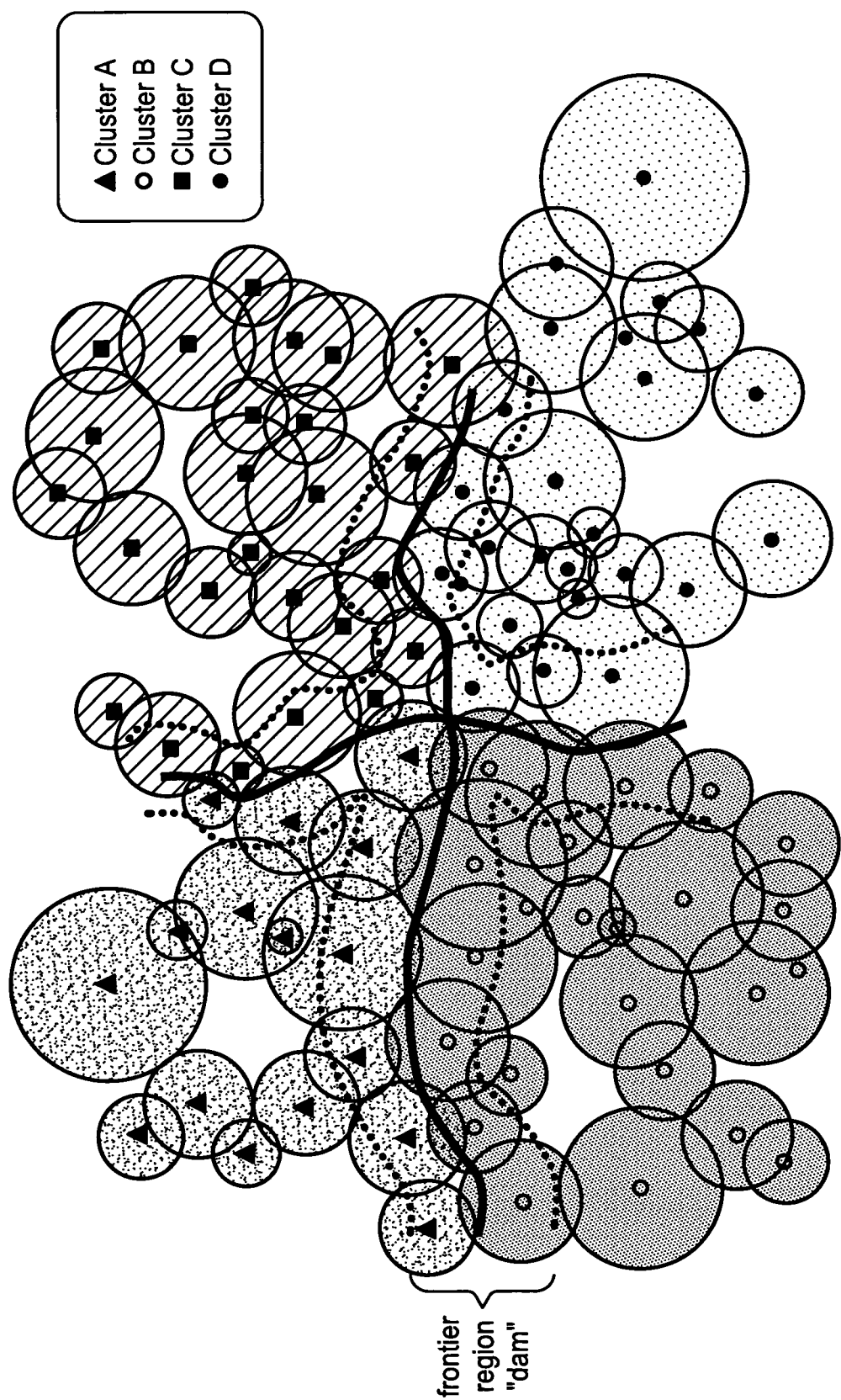
FIG. 8 is a diagram illustrating the resultant cell coverage in the network.

The result of boundary optimisation is shown in FIG. 8 for comparison with FIG. 7. It will be seen for example that coverage gaps along the frontier have been closed.

Relationship Between Optimisation within Cluster and Optimisation Along Frontier The above described processes of optimisation within cluster and optimisation along frontier are basically independent so that propagations of change a through a cluster is stopped by the femtos along its frontiers from continuing into other clusters. This means any disruptions are limited to within one cluster so limiting its effect.

In this example, changes in frontier cell coverage affect within-cluster coverage, but not vice versa.

Converging to an Overall Cell Coverage Solution

Both processes of optimisation within cluster and optimisation along frontier are independent in the sense that both are continuously seeking to optimise the coverage areas of femtos to provide an overall best solution. Of course, this approach is able to react to topology changes, for example as new femtos are introduced or are switched on or off.

As each cluster is defined by the Digital Subscriber Line Access Multiplier (DSLAM) to which its femtos are connected, the maximum number of femtos that may be in the cluster is known in advance. Accordingly, the maximum number of femtos in the frontier region is limited as is the computational complexity in reaching a convergent solution. This means the computational hardware for the inner and boundary optimisations may be optimised in terms of speed, power consumption, size etc for these processes at the scale of the numbers of femtos involved. In this example, the computational hardware is located in the DSLAMs. In an alternative distributed approach (not shown), the hardware is distributed in the femtos. In a further alternative embodiment, the hardware is in an external entity (e.g. a computational element).

The Processes from the Perspective of an Individual Femto

Figure 9:
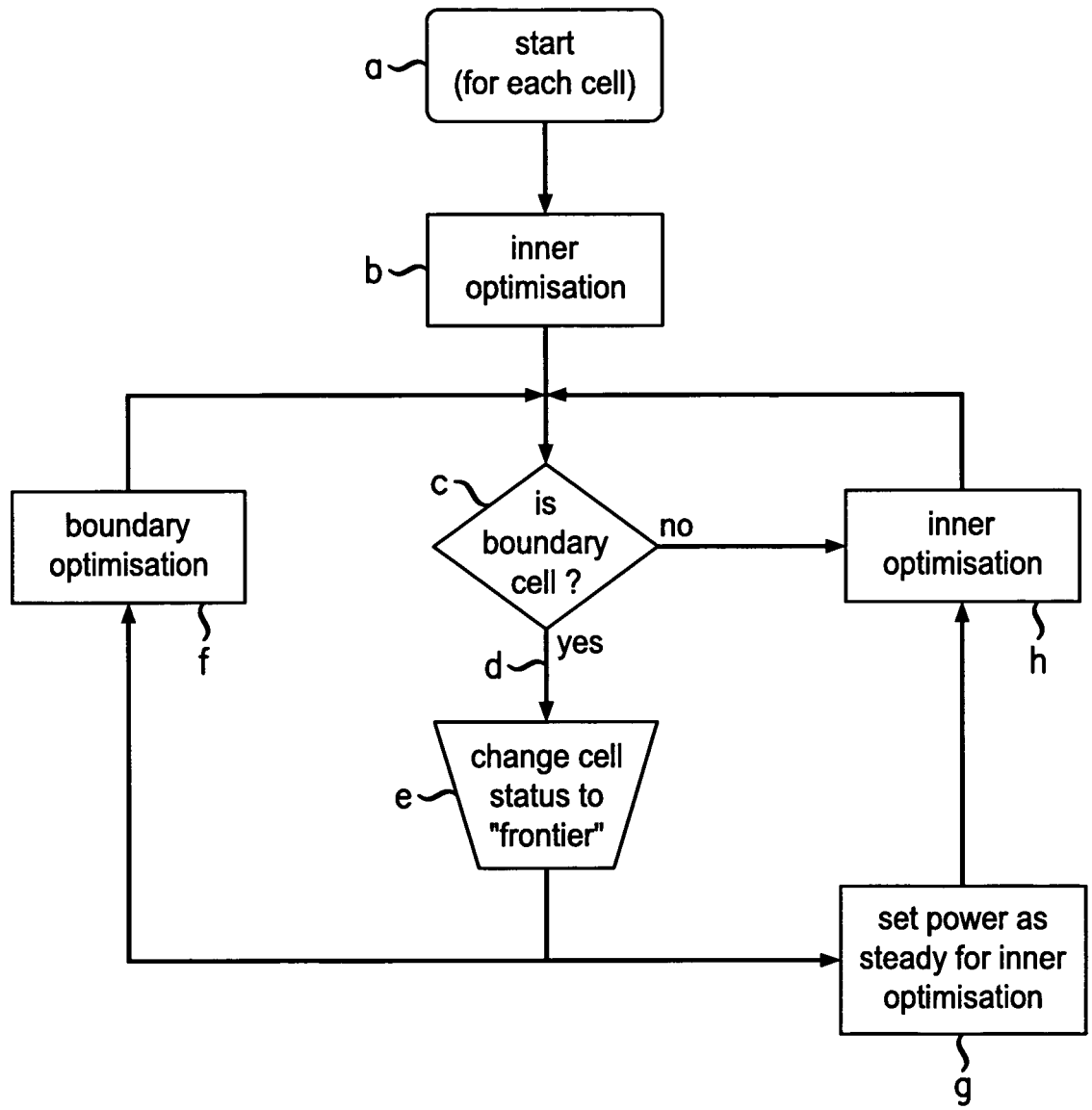
FIG. 9 is a diagram illustrating the cell coverage optimisation process from the perspective of an individual cell in the network shown in FIG. 3.

To further explain the above mentioned approach, let us consider an individual femto within a cluster. As shown in FIG. 9, upon booting up (step a), the femto is automatically included in the inner optimisation process (step b) which deals with power hence coverage area of femtos within the cluster. The femto is given a status of "normal" for this purpose.

A query is then made as to whether (step c) the femtocell is in a frontier region. This query is made upon every algorithm iteration (In an alternative embodiment, the query could be made every time frame). Upon the femto being discovered (step d) as being in a frontier region, because of a notification message from a mobile user terminal to that effect, or a procedure of neighbour femto discovery, then the status of the femto is changed (step e) to "frontier".

At this point, although the "frontier"-status femto is still a part of the inner optimisation process (step h) its power level and hence coverage area is set (step g) for that purpose as being steady. On the other hand, the "frontier"-status femto is included in the boundary optimisation process (step f), which does not consider the non-frontier region femtos.

The effect of introducing frontiers that prevent all nodes in a network from being reconfigured when a change occurs in one cluster may mean that a theoretical optimum global coverage configuration may not be achievable in consequence. In some embodiments (not shown) the deviation from this ideal may be measured or evaluated and may be used as a parameter in clustering and optimisation methods.

Variants

In the above examples, Digital Subscriber Line Access Multipliers (DSLAMs) are used to coordinate the identification of boundary region femtos. An alternative is to instead do this in a distributed manner. Another alternative is for an external entity, for example a computational element, to do this.

In the above example, femtos were considered as clustered by being connected to the same DSLAM. In other embodiments, other groupings are possible, such as grouping femtos according to their paging area codes.

The order in which boundary optimisation and within cluster optimisation are undertaken may depend on the given scenario and constraints. For example, in some other embodiments, for example if femtos are topology-aware such that the femtos at frontiers are identified without within cluster optimisation, then boundary optimisation is performed before within cluster optimisation. In some other embodiments (not shown) for example in critical applications where femtos need setup times that are minimised, the boundary optimisation and within cluster optimisation are performed in parallel.

Figure 10:
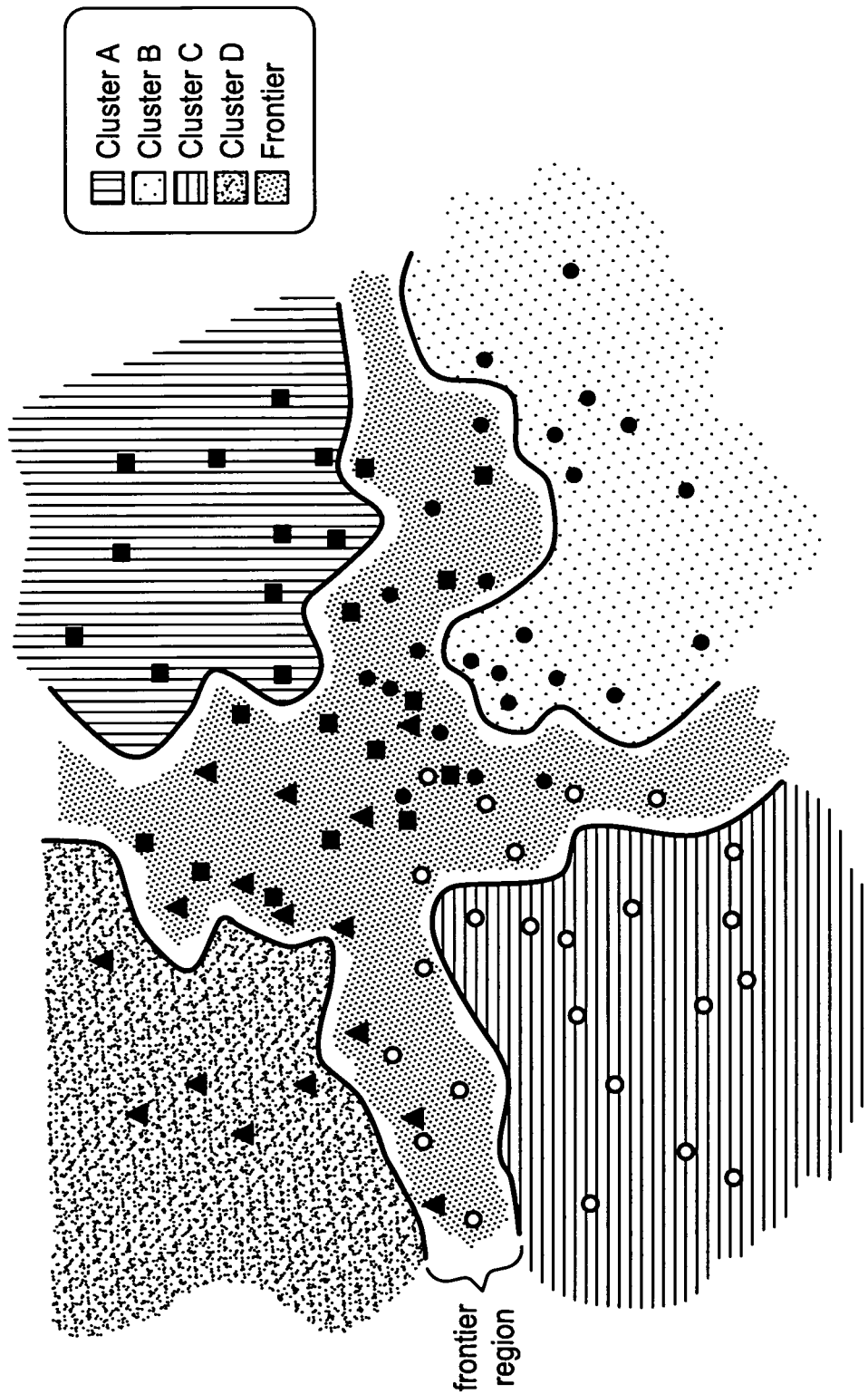
FIG. 10 is a diagram illustrating a network according to a second embodiment of the invention in which clusters overlap.

As shown in FIG. 10, in a slightly different scenario to that described with reference to FIGS. 3 to 8A, clusters can slightly overlap. This may occur in, for example, in real xDSL deployments with regions served by different Digital Subscriber Line Access Multipliers (DSLAMs) somewhat overlapping. The method as described in relation to FIGS. 3 to 8 applies except that a thicker frontier region results.

Figure 11:
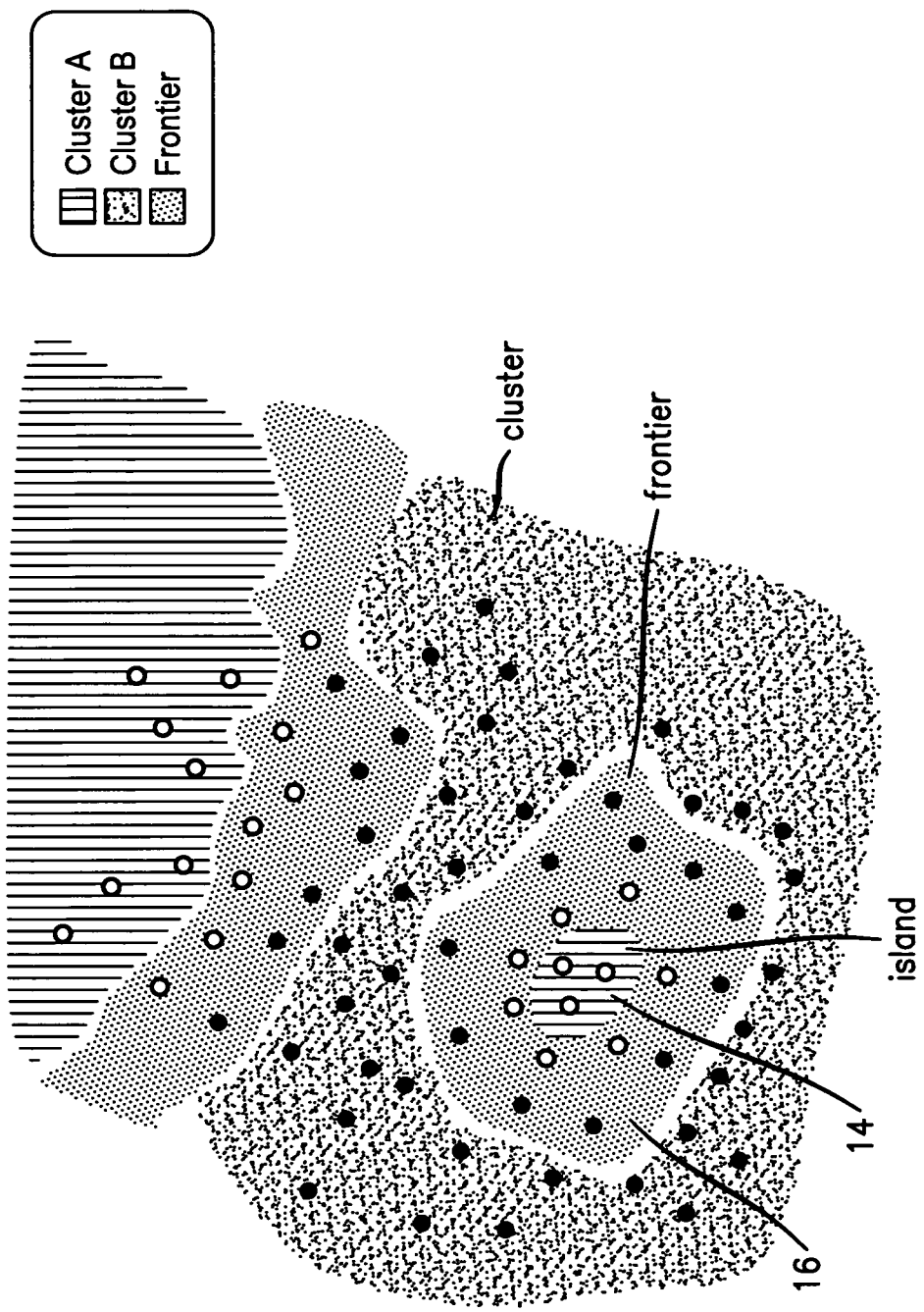
FIG. 11 is a diagram illustrating a network according to a third embodiment of the invention, in which some cells of a cluster, those cells forming an inner and boundary region, lie within another cluster.
Figure 12:
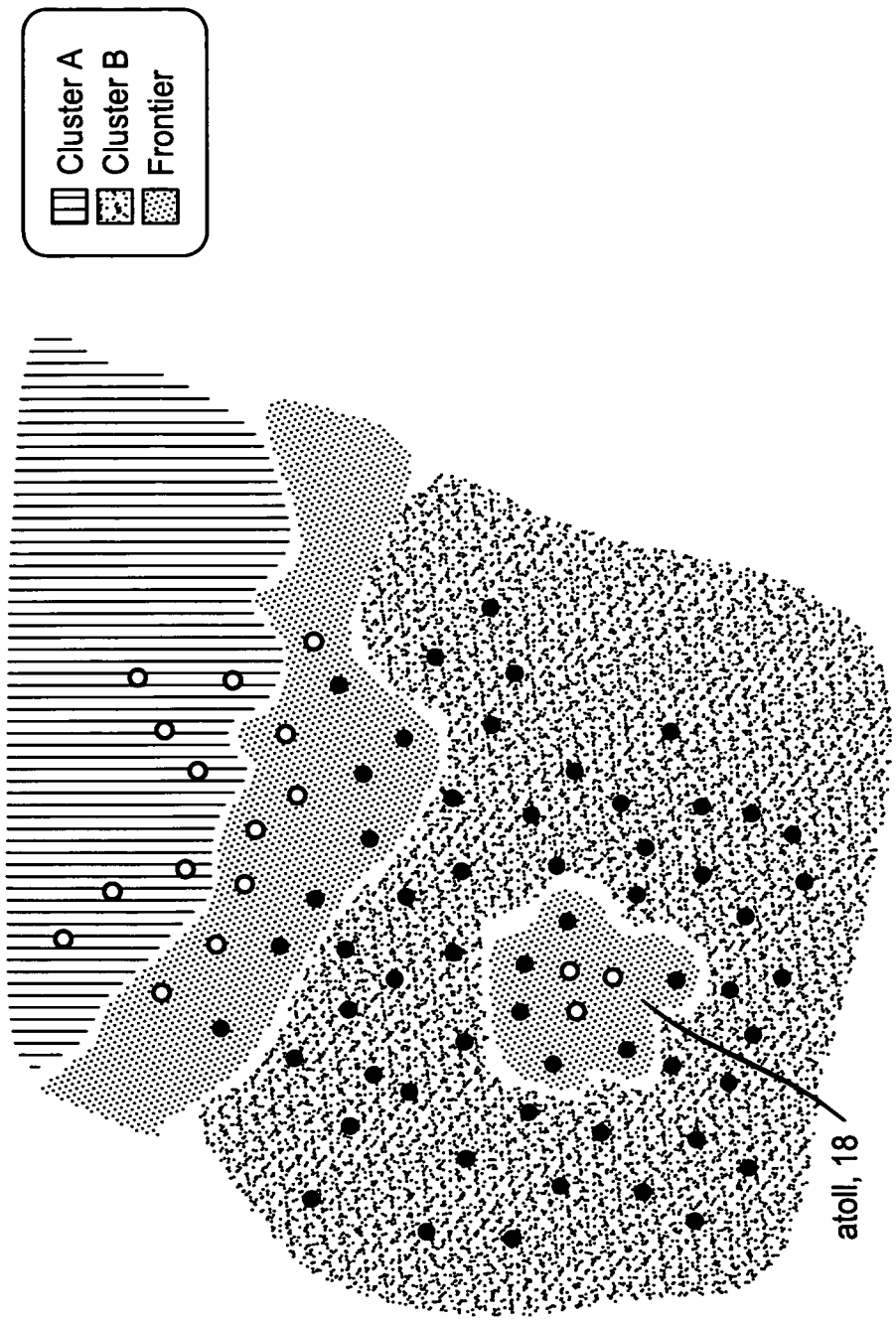
FIG. 12 is a diagram illustrating a network according to a fourth embodiment of the invention, in which a few cells of a cluster, those cells forming a boundary region only, lie within another cluster.

As shown in FIGS. 11 and 12, some other scenarios are where some femtocell base stations belong to a first cluster, lie within a second cluster, detached from the main first cluster.

As shown in FIG. 11, a substantial number of femtos from clusterA lying within clusterB can be considered as an "island" having both cells in an inner region 14 and in a frontier region. This is where the inner region is identified for example from information std in a topology record table in the network. For femtos in the inner region 14 a within-region optimisation (within-cluster type optimisation) is performed. For femtos in the frontier region 16, a boundary optimisation is performed.

As shown in FIG. 12, a smaller number of femtos from clusterA lying within clusterB can be considered as an "atoll" having a frontier region 18 only. For femtos in the frontier region 18, only boundary optimisation is performed.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of configuring nodes of a telecommunications network, in which nodes react to changes in configuration of at least one of their respective neighbour nodes, the method including:

identifying a cluster of neighbouring nodes in a first cluster, identifying which nodes in the first cluster are in a frontier region adjacent to a second cluster, adapting the configuration of nodes in the frontier region in response to changes in the configuration of other nodes in the frontier region, adapting the configuration of nodes in the first cluster in response to changes in the configuration of other nodes in the first cluster while considering the configuration of the nodes in the frontier region to be fixed.

2. A method according to claim 1, in which said adapting the configuration of nodes in the frontier region and said adapting the configuration of nodes in the first cluster occur in parallel.

3. A method according to claim 1, in which the nodes are cellular base stations.

4. A method according to claim 3, in which the characteristic of the base station configuration being adapted is cell size.

5. A method according to claim 3, in which the identifying which nodes in the first cluster are in a frontier region is performed by using information of locations of mobile user terminals that are in a region of coverage overlap of base stations in different clusters.

6. A method according to claim 3, in which each base station of a given cluster is connected to a shared backhaul node, in particular a Digital Subscriber Line Access Multiplier, associated with the respective cluster.

7. A method according to claim 1, in which said method of configuring nodes is undertaken in said second cluster also.

8. A method according to claim 1 in which said adapting the configuration of nodes in the frontier region occurs continuously and/or iteratively.

9. A method according to claim 1 in which said adapting the configuration of nodes in the first cluster to the adapted configuration of other nodes in the first cluster occurs continuously and/or iteratively.

10. A telecommunications network comprising nodes, in which, the nodes are configured to react to changes in a characteristic of their respective neighbour nodes, the network being configured to:

identify a first cluster of neighbouring nodes, identify which nodes in the first cluster are in a frontier region adjacent to a second cluster, adapt the characteristics of nodes in the frontier region in response to changes in the characteristics of other nodes in the frontier region, adapt the characteristics of nodes in the first cluster in response to changes in the characteristics of other nodes in the first cluster while considering the characteristics of the nodes in the frontier region to be fixed.

11. A telecommunications network according to claim 10, configured to conduct in parallel said adapting the characteristics of nodes in the frontier region and said adapting the characteristics of nodes in the first cluster.

12. A telecommunications network according to claim 10 in which the nodes are cellular base stations and the characteristic of the nodes that is being adapted is cell size.

13. A telecommunications network according to claim 12, in which the nodes are femtocell base stations.

14. A telecommunications network according to claim 10, in which the network is configured to adapt the characteristic of nodes in response to their neighbour cells, in said second cluster also.

15. A telecommunications network according to claim 10, in which said network is configured to adapt, in a continuous and/or iterative manner, the characteristics of nodes in the frontier region in response to the adjustment of the characteristics of other nodes in the frontier region and the characteristics of nodes in the first cluster in response to the adjustment of the characteristics of other nodes in the first cluster.

* * * * *